Dec. 14, 1937.   M. C. TERRY ET AL   2,101,881
REFRIGERATION APPARATUS
Original Filed Nov. 4, 1932   3 Sheets-Sheet 1

INVENTORS
M. C. TERRY AND T. A. BUCKLEY
BY
A. B. Reavis
ATTORNEY

Dec. 14, 1937.  M. C. TERRY ET AL  2,101,881

REFRIGERATION APPARATUS

Original Filed Nov. 4, 1932  3 Sheets-Sheet 2

WITNESSES:

INVENTORS
M. C. Terry, and T. A. Buckley
BY
A. B. Reavis.
ATTORNEY

Dec. 14, 1937.    M. C. TERRY ET AL    2,101,881
REFRIGERATION APPARATUS
Original Filed Nov. 4, 1932    3 Sheets-Sheet 3
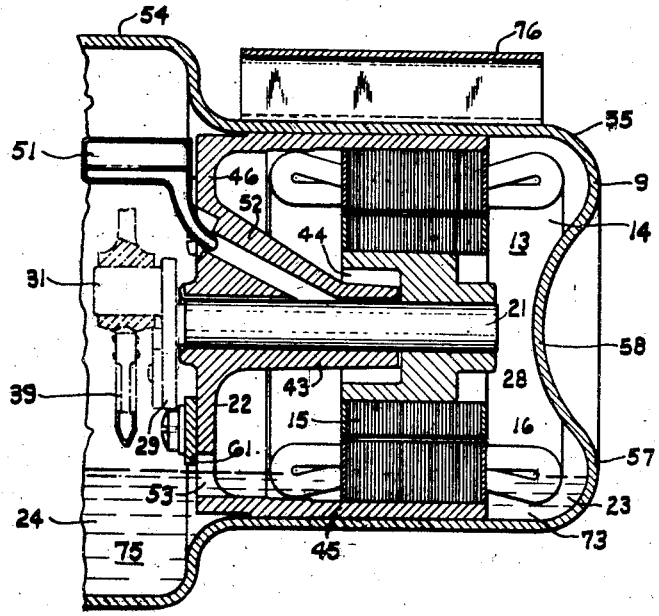
FIG. 4.
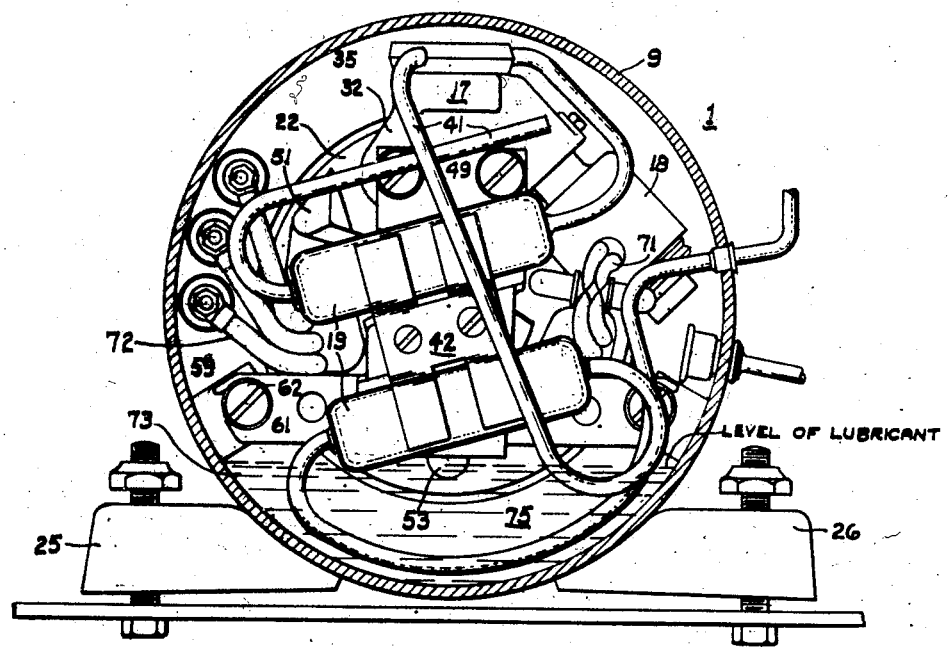
FIG. 5.    INVENTORS
M. C. TERRY AND T. A. BUCKLEY
BY
a. B. Reavis.
ATTORNEY Patented Dec. 14, 1937

2,101,881

UNITED STATES PATENT OFFICE 2,101,881

REFRIGERATION APPARATUS

Matson C. Terry, New Rochelle, N. Y., and Thomas A. Buckley, Springfield, Mass., assignors to Westinghouse Electric and Manufacturing Company, a corporation of Pennsylvania Application November 4, 1932, Serial No. 641,284
Renewed February 25, 1937

14 Claims. (Cl. 230—58)

Our invention relates to refrigeration apparatus of the compression type wherein a hermetically sealed motor-compressor unit is utilized to compress the refrigerating medium.

It is an object of the invention to provide a means for assembling and mounting a motor-compressor unit in a hermetically sealed casing whereby the entire unit may be assembled and tested outside the casing and then inserted into the casing, after which the casing is sealed, preferably by a separate sealing member.

It is another object of the invention to provide a novel means for supporting and aligning the motor-compressor unit of the above construction in the hermetically sealed casing.

It is still another object of the invention to provide a hermetically sealed casing of such shape and characteristics that it is inexpensive to manufacture, and is well adapted for the assembly and operation therein of a refrigerator motor and compressor.

It is another object of the invention to provide an improved lubrication system for a sealed motor-compressor unit whereby an adequate supply of lubricant is ensured for lubricating the working parts of the motor and compressor and interference with the operation of the motor by lubricant is minimized.

It is a further object of our invention to provide at least the motor enclosing portion of the casing hermetically sealing a refrigerator motor compressor unit with external fins for dissipating motor heat.

It is a still further object to provide refrigerating apparatus having a compact arrangement of the motor-compressor unit and cooling fan and its motor.

It is a still further object of the invention to provide a motor and compressor unit which is supported solely by a web in a sealed casing, in which good heat transfer is ensured from the motor and compressor to the ambient air outside.

It is another object of the invention to provide a novel supporting means for a hermetically sealed motor compressor unit exterior of the sealed casing.

These and other objects are effected by our invention as will be apparent from the following description and claims taken in connection with the accompanying drawings, forming a part of this application, in which:

Fig. 4 is a view taken on line IV—IV of Fig. 3, and illustrates a portion of the lubricating system for the motor-compressor unit;

Fig. 5 is an end view of the motor compressor unit shown in Fig. 2 with only the end cap cut away.

Figure 1:
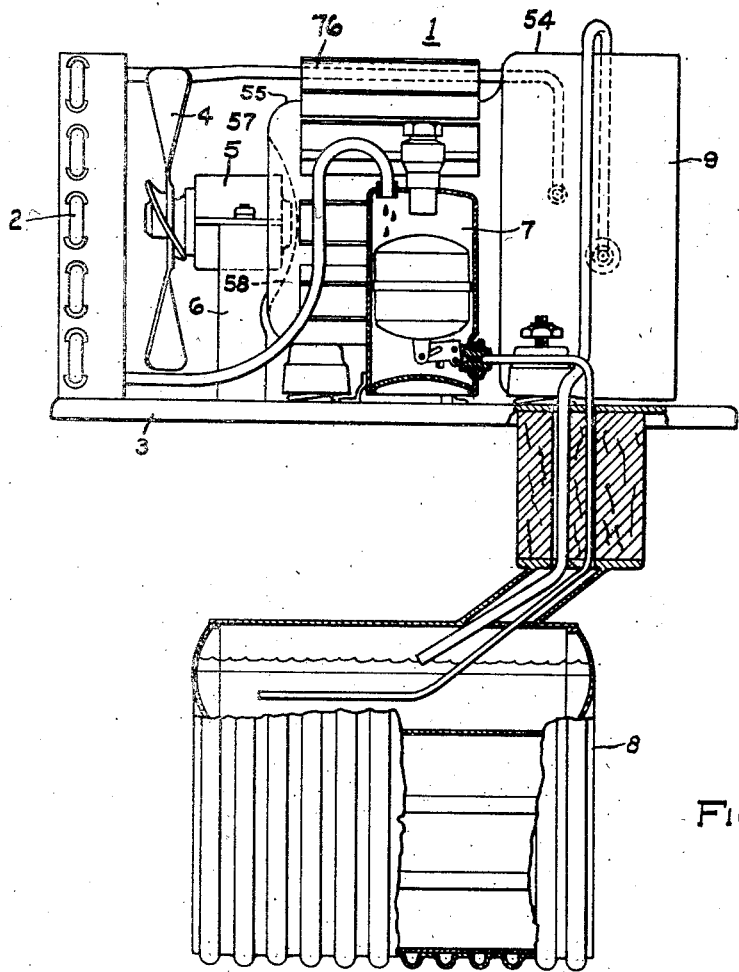
Fig. 1 is a view, partly in section of a complete refrigeration apparatus of the compression type wherein the motor and compressor are contained in a hermetically sealed casing.

Our invention comprehends several aspects or features, one of which pertains to the assembly and test of the motor-compressor unit. A web or spider is utilized for completely supporting and aligning the motor, compressor and attendant parts, which web fits snugly into the casing after the various parts have been assembled and tested on the web. The casing is preferably open at a single end and the motor, compressor and web assembly is inserted into the casing through this open end, which is then sealed.

A second feature of the invention is the provision for lubricating the working parts of the motor and compressor in such a manner that an adequate supply of lubricant is always ensured to the lubricant actuating or distributing means and lubricant interference with the operation of the motor is prevented without the use of expensive castings or pumps to prevent such interference. This is accomplished broadly by two separate details of the motor-compressor unit, one of them being the shape of the casing and the other the design of the shaft bearing and rotor of the motor. The casing is preferably disposed horizontally and is provided with a circumferentially enlarged portion in which lubricant actuating means and the compressor are disposed. The motor is disposed in the smaller portion of the casing and a perforate partition or web separates the motor and compressor. Lubricant is free to flow between the compartments formed.

The casing includes large and small portions and it is preferably disposed horizontally so that the large portion may serve as a lubricant reservoir. The web portion of the assembly constitutes the means for supporting the assembly in place interiorly of the casing with the motor disposed in the small portion and the compressor in the large portion. Mechanism utilized to transmit motion from the motor to the compressor is provided with means for supplying or distributing lubricant from the reservoir to parts requiring lubrication. The web not only restricts lubricant from being splashed into the motor, but, due to the presence of openings at the bottom thereof, lubricant may drain back from the small portion of the housing encompassing the motor, into the large portion, the drainage openings being arranged below the motor air gap to prevent lubricant accumulating in the motor portion of the housing to the level of the air gap.

The second feature of the lubricating system resides in the overlapping construction of the motor bearing and rotor hub whereby lubricant which leaks past the bearing is carried to the end of the rotor and is thrown by centrifugal force past the motor air gap. It is to be noted as the description advances, that this construction also serves another very useful function.

A third feature of the invention resides in the dissipation of heat from the motor and compressor, this being a problem because the sealed-in motor and compressor are solely supported by a web, and are, therefore, not in direct thermal contact with the casing. Therefore, the web and casing are constructed and arranged to dissipate heat from the unit. The motor end of the casing is reduced in diameter so that it snugly surrounds the motor and supporting web and the web is lengthened so that a good thermal contact exists between the motor and the casing through a large area of the web. The compressor also has a large portion of the cylinder block in good thermal contact with the casing through the medium of the web.

A fourth feature of the invention is the provision of an extremely compact refrigeration machine. This is accomplished by the design of the casing and also by the design of the motor bearing and rotor or rotor hub. The casing is formed with portions of larger and smaller diameters and the cooling fins are arranged on the smaller portion of the casing. One end of the casing is depressed, where ordinarily there would be waste space in part bounded by the outer end of the motor field coils, and the fan motor is at least partially disposed in the depression. Space is further conserved within the motor-compressor unit by the telescopic arrangement of the motor bearing and the rotor hub.

Several other features of the invention will be noted as the description advances, such as the supporting means for the motor-compressor unit, whereby vibration is decreased, the adjustment for the head clearance of the compressor cylinder, and the means for supporting the entire apparatus from a single base plate.

Referring specifically to the drawings, numeral 1 designates generally a motor-compressor unit, which pumps refrigerant to a condenser 2 supported on a base plate 3, where cooling of the refrigerant occurs, assisted by a forced draft of air from a fan 4 driven by a small motor 5 which is also supported on the base plate 3 by a bracket 6. From the condenser 2, refrigerant flows to a valve, herein shown as a float valve 7, and thence to an evaporator 8, both of which are solely supported by the base plate 3. Refrigerant boils in the evaporator 8, thereby absorbing heat from the surrounding media, and is drawn back to the motor-compressor unit 1, whereupon the cycle is repeated.

Figure 2:
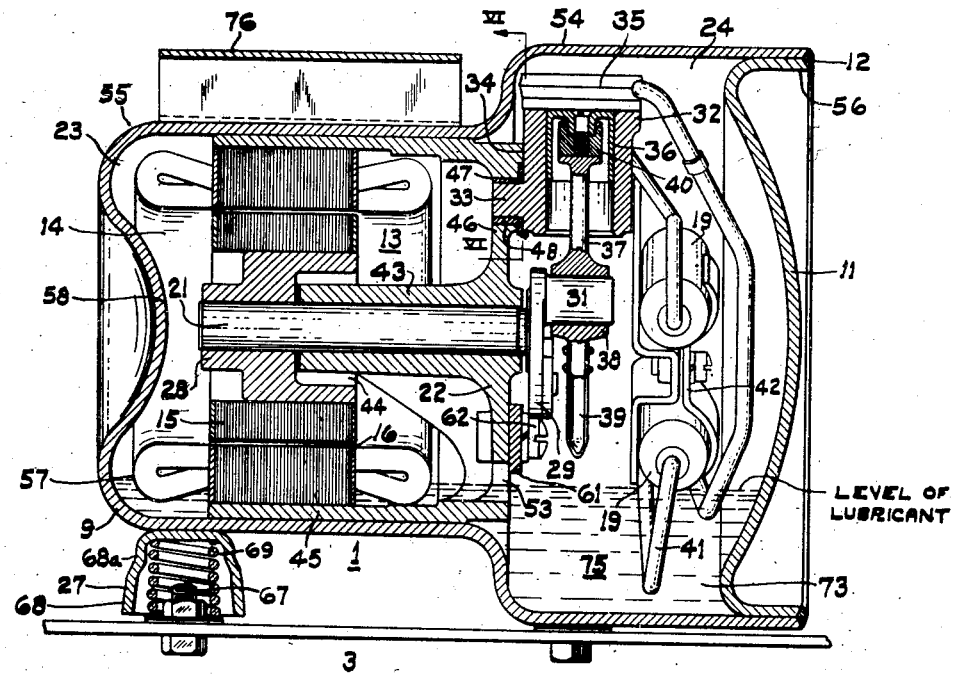
Fig. 2 is a sectional view of a motor compressor unit contained in a hermetically sealed casing and illustrates one embodiment of our invention.

In general, the motor-compressor unit 1 comprises a housing in the form of a cup-shaped casing 9 and a sealing end cap 11 welded peripherally of the edge of the housing as shown at 12 (Fig. 2). Within the casing are disposed a motor 13 comprising field coils 14 and a rotor 15 with an air gap 16 therebetween; a compressor 17 on which is supported an unloader 18 and a set of mufflers 19; and a shaft 21 for operatively connecting the motor and compressor. A web 22 completely supports the motor 13, compressor 17 and shaft 21 within the casing, and divides the casing into a motor compartment 23 and a compressor compartment 24. The entire unit rests on three resilient legs 25, 26 and 27 which are supported by the base plate 3.

The motor 13, specifically comprises the field coils 14 and the rotor 15. The rotor 15 is attached to a rotor hub 28 having a depression or recess cut therein and the hub 28 is mounted on the shaft 21. The end of the shaft is provided with preferably an integral counterweight 29 and a crank pin 31.

The compressor 17 specifically comprises a cylinder block 32 provided with a dowel pin 33 and a flat face 34 for a purpose hereinafter described. The compressor further comprises a head 35, a piston 36, a connecting rod 37, and a crank pin bearing 38 at the end of the connecting rod 37 cooperating with the crank pin 31 so that reciprocatory motion is applied to the piston 36 as the shaft 21 rotates. The piston 36 is connected to the connecting rod 37 by any suitable means such as a wrist pin 40. Attached to the connecting rod 37 is a lubricant actuating means in the form of a scoop 39 which is caused to travel in a substantially elliptical path due to the motion of the connecting rod.

Figure 3:
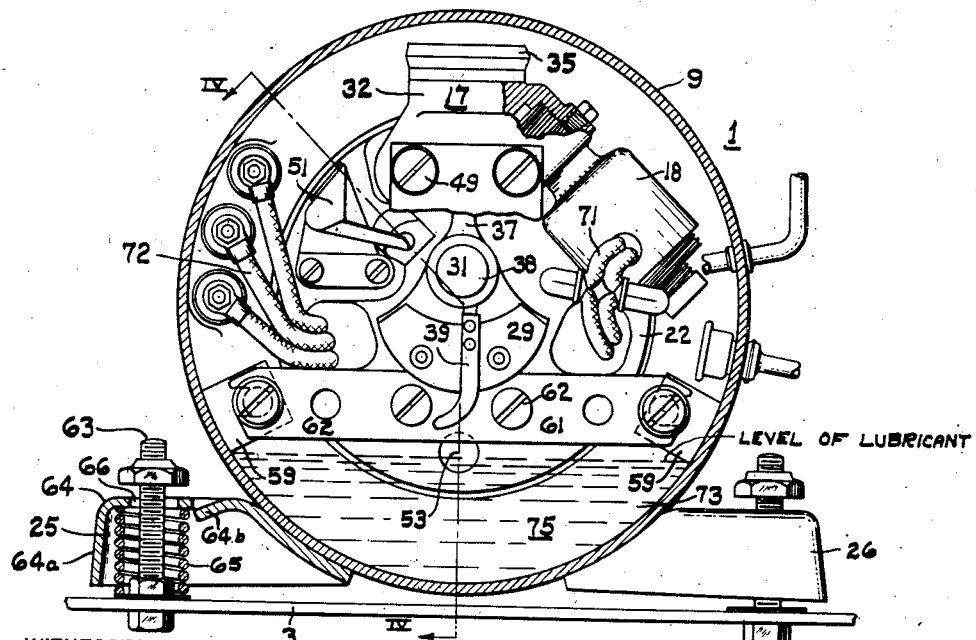
Fig. 3 is an end view of the motor compressor unit shown in Fig. 2 with the end cap, mufflers and supporting bracket therefor removed.

The mufflers 19 are attached to the suction and discharge side of the compressor 17 by suitable conduits 41 and are supported thereon by a bracket 42. The unloader 18 is threaded directly to the compressor 17 as shown in Fig. 3 and is disposed between the compressor and the muffler bracket 42.

The cup-shaped web 22 is provided for supporting the motor 13 and the compressor 17 with its attendant mufflers 19 and unloader 18. The web 22 includes an elongated central bearing 43 for the shaft 21, the shaft extending through the web 22. One end of the elongated bearing 43 enters a recess 44 in the rotor hub for purposes hereinafter described. An outside or sleeve portion 45 of the web 22 supports the motor field coils 14, which coils are preferably fastened therein by a press fit. The web 22 provides a partition 46 between the motor compartment 23 and the compressor compartment 24.

Figure 6:
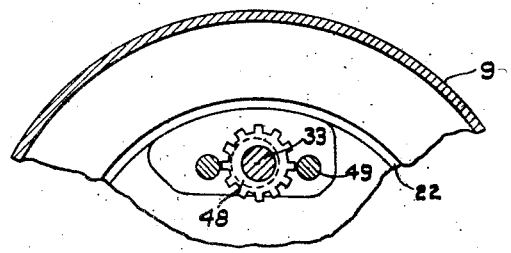
Fig. 6 is a view taken on line VI—VI of Fig. 2 and illustrates the cylinder head adjusting device for the hermetically sealed compressor.

An aperture 47 is provided in the web near the top thereof, and the cylinder block 32, with the mufflers 19 and unloader 18 both attached thereto, is partially supported by the web by the insertion of the dowel pin 33 into the aperture 47, the flat face 34 of the cylinder block 32 contacting with the web 22. The piston 36 is disposed in the cylinder 32 whereupon the cylinder block 32 is attached to the web 22, and the head clearance of the compressor is adjusted by rotation of an internally eccentric bushing 48, (Fig. 6) as fully described in the copending application of C. F. Nystrom for Compressor, Serial No. 637,512, filed October 10, 1932. After the adjustment is made, the cylinder block 32 is clamped tightly to the web 22 by bolts 49.

As shown most clearly in Fig. 4, the web 22 is provided with a lubricant catcher 51, the tail of which extends into an oil slot 52 leading diagonally to the shaft bearing 43, so that the bearing will receive lubricant which enters the catcher 51. The web 22 is also provided with an aperture 53 near the bottom thereof for a purpose hereinafter described.

The substantially cup-shaped casing 9 is provided with an enlarged portion 54 in which the compressor is disposed, hereinafter referred to as either the enlarged portion or compressor portion of the casing, and a portion of smaller diameter 55 in which the motor 13 is disposed, hereinafter referred to as the smaller portion or motor portion of the casing 9. The casing is provided with one open end 56 and a closed end 57. A depression 58 is provided in the closed end 57 of the casing 9 which extends into the space bounded by the outer end of the field coils 14. The diameter of the small end 55 of the casing is such that the sleeve portion 45 of the web 22 fits snugly therein and is supported thereby. Lugs 59 are provided preferably welded to the casing 9 and a cross member 61 is attached to the lugs 59 and to the web 22 by bolts 62, whereby relative movement between the web 22 and the casing 9 is prevented. The motor and compressor are preferably disposed in the casing in horizontal relation, and the end of the casing is sealed by the cap 11 welded peripherally of the casing, as fully shown and described in copending application of M. C. Terry for Refrigeration apparatus, Serial No. 560,689, filed September 2, 1931.

The casing 9 is supported on the base plate 3 by legs 25, 26 and 27. The two rear legs 25 and 26 each comprise a bolt 63 extending upwardly from the base plate 3, a cup 64 attached to the casing 9 and a resilient member 65. The bolt 63 extends through an aperture 66 in the cup which acts as a guideway for the bolt 63. The resilient member 65 is interposed between the base 3 and the cup 64 and surrounds the bolt 63, whereby a resilient mounting is obtained. The cup 64 is provided with a side wall 64a which fits snugly over the resilient member 65, and a downstruck portion 64b, the wall 64a and portion 64b acting as an exterior guideway for the resilient member 65. The front leg 27 comprises a small guide bolt 67 and a cup 68 with a resilient member 69 between the base 3 and the cup 68. The bolt 67 extends part way through the resilient member 69 and provides a guide therefor. The cup 68 is provided with an indentation 68a which assists in guiding the resilient member 69. The two legs 25 and 26 are disposed intermediate of the enlarged portion 54 of the casing 9 longitudinally thereof, and slightly outwardly therefrom in a radial direction. The third leg 27 is disposed intermediate of the small end 55 of the casing 9 both longitudinally and radially thereof.

As heretofore stated, the construction shown is adaptable for quantity production, assembly and test. The unit is assembled by first disposing the shaft 21 in the central bearing 43 of the web 22. The rotor hub 28 is then placed in the rotor 15 and the resultant assembly is disposed on the end of the shaft extending outwardly from the bearing 43, the bearing 43 being disposed in the recess 44 of the rotor hub 28. The field coils 14 are then preferably pressed into the sleeve portion 45 of the web 22, thus completing the motor assembly.

Next the compressor 17 and its attendant parts are assembled. The lubricating scoop 39 is first attached to the connecting rod 37, and the wrist pin 40 is placed in the connecting rod 37 which is then disposed in the piston 36, the wrist pin being attached to the piston 36 by any suitable means. The resultant assembly is placed in the cylinder block 32 on which the head 35 has been disposed and the crank bearing 38 is slipped over the crank pin 31. The cylinder is then hung by the dowel pin 33 on the web 22 entering the eccentric bushing 48 which has already been inserted in aperture 47, and after adjustment of the head clearance by rotating the eccentric bushing 48 to the appropriate position the cylinder is clamped to the web 22 by the bolts 49 which extend through the cylinder block 32 and into the web 22. The muffler bracket 42 has been heretofore attached to the cylinder 32 and the mufflers 19 are disposed on the bracket 42, after which the conduit connections 41 are made to the compressor 17. The unloader 18 is then attached to the compressor 17 and electrical connections are made with the motor through conductors 71.

The unit is thus completely assembled on the web 22 outside of the casing 9 where easy access may be had to it. Before placing this assembled unit in the casing 9, the unit is tested and the bearings are run in a light oil bath. If it is necessary to provide an oil free unit to properly dry the same, the motor field coils 14 may be removed, the remainder of the unit dipped in an oil dissolving material, and a new set of field coils attached to the web.

The assembled unit is then inserted into the casing 9 through the open end 56 thereof, and the electrical connections 72 are made to the motor 13 through the casing 9, and the refrigerant connections 41 are completed. The cross member 61 is then bolted on to the web 22 and the casing 9 to prevent relative movement therebetween, and the end cap 11 is welded to the casing 9 to effectively seal it. The remainder of the apparatus is then assembled, all of it being supported by the base plate 3, the legs 25, 26 and 27 supporting the casing 9.

Turning now to the lubricating system, the hermetically sealed unit is provided with a reservoir of lubricant 73 which, due to the opening 53 in the bottom of the web 22 is free to flow between the motor chamber 23 and the compressor chamber 24. The amount of lubricant supplied to the casing 9 is such that it does not normally rise above the field windings 14 of the motor 13 and therefore does not enter the air gap 16. The usual level of lubricant is shown in Figs. 2, 3 and 5. Due to the enlarged portion 54 of the casing 9 in which the compressor 17 and oil scoop 39 are disposed, a deep reservoir of lubricant 75 is provided in a portion of the casing where it is necessary but does no harm, in other words, does not interfere with the operation of the motor 13.

When the piston 36 is reciprocated by rotation of the motor 13 the oil scoop 39 is moved in a substantially elliptical path and throws lubricant upwardly to the moving parts of the compressor 17. Part of the lubricant thrown by the scoop 39 enters the catcher 51, from which the lubricant drains through the oil slot 52 in the web 22, as shown in Fig. 4, to the shaft bearing 43. Part of the lubricant drops from the end of the shaft 21 into the compressor chamber lubricant reservoir 75, and part exudes from the opposite end of the shaft bearing 43 and drops into the recess 44 of the rotor hub 28. Since the rotor hub end which contains the recess 44 extends along the rotor to the end thereof, and since the rotor hub is normally rotating at a high speed, lubricant exuding from the recess 44 is thrown outwardly by centrifugal force past the air gap 16. Lubricant thus thrown outwardly drains to the bottom of the motor chamber 23 of the casing 9, and returns to the reservoir 75 in the compressor chamber 24 through the aperture 53 in the bottom of the web 22, whereupon the lubricating cycle is repeated. It will be noted that the cup-shaped web 22 by providing the partition 46 prevents lubricant which is splashed upwardly by the scoop 39 from entering the motor chamber 23. It is therefore apparent that a lubricating system is provided which ensures proper lubrication of the working parts of the motor compressor unit at all times, and also prevents or minimizes lubricant interference with the motor 13. It will further be noted that lubricant which is thrown onto the compressor 17, the motor bearing 43 and the field 14 assists in cooling the motor and compressor by absorbing heat therefrom, which heat purifies the lubricant by boiling out a portion of the refrigerant which is contained therein.

The cooling of the motor 13 and compressor 17 as heretofore stated is normally a problem because the motor 13 and compressor 17 are completely suspended on the web 22 and are therefore not in intimate thermal contact with the casing 9.

Cooling of the motor 13 is accomplished by providing good thermal contact with the web 22 along the entire length of the motor field 14. The rotor 15 of the motor dissipates heat through the shaft 21 to the web 22. The web 22 is in good thermal contact with the casing 9 since it fits snugly therein and the heat of the motor is therefore dissipated to the casing 9. Fins 76 attached to the outside of the motor end 55 of the casing 9 assist in dissipation of the heat therefrom, the fan 4 assisting natural convection and radiation by forcing a draft of cooling air over the fins 76 and thence over the enlarged portion of the casing 54. The heat from the compressor 17 is dissipated first to the web 22 through the flat contacting face 34 of the cylinder 32. Again the heat absorbed by the web is transmitted to the casing 9 and the fins 76. It will be noted that the motor end of the casing 55 is smaller than the end enclosing the compressor 54. By this means it is possible to provide a bore and stroke for the compressor 17 which is efficient, and since the motor 13 is smaller in diameter than the necessary diameter of compressor housing, the motor housing is made smaller so that good thermal contact may be obtained with the motor field 14 and rotor 15 through the web 22.

The compactness of the unit is attained by, first, the telescopic arrangement of the central bearing 43 and the rotor hub 28 of the motor compressor unit; secondly by the shape and design of the casing 9 and the manner in which the fins 76 are disposed thereon. Taking these features in the above-mentioned order, the telescopic arrangement of the central bearing 43 and the rotor hub 28 makes possible a definite shortening of the casing 9 whereby valuable space is saved. The casing 9 being provided with the recess 58 in which the fan motor 5 is placed further conserves space longitudinally. The smaller portion 55 of the casing 9, with fins 76 disposed thereon of a dimension substantially the same or less than the outer diameter of the larger portion 54 of the casing 9, conserves space in vertical and horizontal directions.

The placement of the legs 25, 26 and 27 provide a three point spring suspension which dampens vibrations in any direction.

From the foregoing it will be apparent that we have provided a refrigerating apparatus, which is inexpensive to manufacture and which adapts itself to quantity production and test. Furthermore, the unit is provided with a lubricating system which provides adequate lubrication for the working parts thereof, without interference with the operation of the rotor. Cooling of the motor and compressor is effectively obtained, and the apparatus is extremly compact. In addition to the above a form of suspension from a base plate is provided for all of the apparatus, and a resilient suspension is provided for the motor-compressor unit which dampens vibrations in every direction.

While we have shown our invention in but one form it will be obvious to those skilled in the art that it is not so limited, but is susceptible of various changes and modifications, without departing from the spirit thereof, and we desire, therefore, that only such limitations shall be placed thereupon as are imposed by the prior art or as are specifically set forth in the appended claims.

What we claim is:—

1. In refrigerating apparatus of the compression type wherein refrigerant undergoes cycles of evaporation, compression and condensation, a horizontal housing having portions of smaller and larger diameter, a motor disposed in the housing portion of smaller diameter and including a stator and rotor, the stator being in heat conductive relation with respect to the housing portion wall, a frame member supported by the housing interiorly thereof and having a central bearing, a shaft carried by the bearing and connected to the rotor, a compressor disposed in the housing portion of larger diameter and carried by the frame, mechanism disposed in the housing portion of larger diameter and operated by the shaft for operating the compressor, the lower part of the housing portion of larger diameter constituting a reservoir for lubricant and the lower portion of said frame having an opening therein providing for drainage of lubricant from the housing portion of smaller diameter to the reservoir, whereby a normal level of lubricant may be maintained below the motor air gap, and means actuated by said mechanism for effecting circulation of lubricant from the reservoir to parts requiring lubrication.

2. Refrigerating apparatus including a housing, a compressor and a motor disposed in the housing, said motor comprising a stator, a rotor including a hub and a shaft attached to said rotor hub, a frame for supporting the motor and compressor and provided with a central bearing for supporting the shaft, said rotor hub being counterbored to overlap said bearing, the end of the counterbored portion of the rotor hub extending substantially to the end of the rotor, and means for delivering lubricant to the bearing, the overlapping counterbored portion of the rotor hub serving to convey a portion of the surplus lubricant exuding from the bearing to one end of the rotor from which is is thrown, due to centrifugal force, past the air gap of the motor.

3. In a refrigerating apparatus, wherein a refrigerant is successively compressed, condensed and evaporated, a compressor, a motor for driving the compressor comprising a field winding, an armature, and a shaft rotated by said armature, a frame for supporting the motor and compressor and provided with a bearing for said motor and motor shaft, a casing for housing the aforementioned parts, said casing having a portion thereof enlarged circumferentially, said compressor being disposed in said enlarged portion, the lower portion of the casing enlargement providing a lubricant reservoir, the level of which is below the air gap of the motor, said field winding being partially immersed in the lubricant in said reservoir, said frame providing a partition between the motor and compressor portions of the casing, said frame having an opening near the bottom thereof to provide a passageway between the motor and compressor portions for lubricant, and means for directing lubricant from the reservoir to the compressor and to the working parts of the motor.

4. In a refrigerator of the hermetically-sealed type, a horizontally-arranged casing which is cirular in cross-section and has portions of smaller and larger diameter, the portion of larger diameter being disposed at one end. a frame member fitting interiorly and carried by the casing portion of smaller diameter, an electric motor carried by the frame member and disposed within the space of the casing portion of smaller diameter, a compressor carried by and disposed within the casing portion of larger diameter, said compressor including elements having greater radial extent than the internal radius of the casing portion of smaller diameter, the lower part of said casing portion of larger diameter containing a lubricant reservoir whose normal level is below the air gap of the motor, means for supplying lubricant from the reservoir to the motor and compressor parts requiring lubrication, and means for sealing the casing.

5. In a refrigerating apparatus in which a refrigerant is successively compressed, condensed and evaporated, a housing, a frame of substantially less length than the housing fitting interiorly thereof, and having a central bearing, a shaft fitting said bearing, a motor including a stator carried by the frame and a rotor carried by the shaft and overhanging one end of the bearing, a compressor cylinder arranged normally with respect to said shaft and provided with inlet and discharge conduits, means for connecting the cylinder laterally to the frame, a piston for the cylinder, a crank on the shaft and provided with a rod operatively connected to the piston, a bracket arranged at the side of the cylinder opposite to the frame, detachable means connecting the bracket to the cylinder, and mufflers carried by the bracket for connection to the inlet and discharge conduits of the compressor.

6. In a refrigerating apparatus in which a refrigerant is successively compressed, condensed and evaporated, a housing, a frame of substantially less length than the housing fitting interiorly thereof, and having a central bearing, a shaft fitting said bearing, a motor including a stator carried by the frame and a rotor carried by the shaft and overhanging one end of the bearing, a compressor cylinder arranged normally with respect to said shaft and provided with inlet and discharge conduits, means for connecting the cylinder laterally to the frame, a piston for the cylinder, a crank on the shaft and provided with a rod operatively connected to the piston, a bracket arranged at the side of the cylinder opposite to the frame, detachable means connecting the bracket to the cylinder, and mufflers carried by the bracket for connection to the inlet and discharge conduits of the compressor, and an unloader carried laterally by the cylinder in the region between the bracket and the frame.

7. In a refrigerator of the hermetically-sealed type, a horizontal cup-shaped metallic housing which is circular in cross section and has portions of smaller and larger diameter, the portion of larger diameter being disposed at the mouth end; a frame member fitting interiorly and carried by the portion of smaller diameter; an electric motor carried by the frame member and disposed within the space of the housing portion of smaller diameter; a compressor carried by the frame and disposed within the portion of the housing of larger diameter; a metallic end cap connected peripherally to the mouth end of the housing; and supporting means for the housing including one member arranged centrally underneath the housing portion of smaller diameter, said supporting means also including two members extending laterally from the housing portion of larger diameter, and resilient means cooperating with all of said members.

8. In a refrigerating apparatus in which a refrigerant is successively compressed, condensed and evaporated, the combination of a compressor, a motor for driving the compressor comprising a field winding and a rotor, a casing for housing the motor and the compressor, a fan for forcing a draft of air over the casing and a motor for driving the fan, said casing having an end wall depressed inwardly of one end of the compressor motor field winding to provide a cavity within which the fan motor is partially located.

9. In refrigeration apparatus of the hermetically sealed type, a metallic hermetically sealed casing, a frame disposed interiorly of the casing, a compressor embodying stationary and movable elements supported by the frame, a motor and a drive shaft connecting the motor and the compressor, said frame having an opening therein disposed radially of the drive shaft, the stationary element of the compressor having a projection adapted to enter the opening in the frame to partially provide support for the stationary element of the compressor, and means for clamping the stationary element of the compressor to the frame.

10. In refrigerating apparatus, a hermetically sealed lubricant containing casing having a lubricant reservoir in the bottom thereof, a removable frame member disposed in the casing for dividing the casing into a motor compartment and a compressor compartment, a motor disposed in the motor compartment and a compressor disposed in the compressor compartment, a drive shaft extending through the removable frame member for connecting the motor and the compressor, bearing means provided in the frame member for said drive shaft, said bearing means being disposed substantially within the motor compartment, means for conveying lubricant to said bearing means comprising a lubricant thrower and a lubricant catcher disposed in the compressor chamber, and means for supporting the lubricant catcher above the lubricant reservoir on said frame member, said frame member being disposed in such position that the lubricant catcher receives lubricant from the lubricant thrower, said removable frame member having a passage therein connecting the lubricant catcher in the compressor chamber and the bearing means in the motor chamber, for conveying lubricant therebetween and having another passageway therein below the level of the lubricant in the bottom of the casing for connecting the motor chamber and the compressor chamber, whereby lubricant is circulated between the chambers.

11. In a refrigerating machine of the hermetically sealed type, the combination of a hermetically-sealed casing having a detachable portion, a frame disposed entirely inside the casing, said frame having a central bearing and a sleeve portion spaced from the axis of the bearing and said frame being carried by said casing, a shaft carried by the bearing, an electric motor including a field element encompassed and carried by said sleeve portion, the greater extent of the outer area of the sleeve portion carrying the field element metallically engaging the interior of the casing for the transmission of heat to the casing, a rotor element connected to the shaft adjacent to said bearing, and a compressor supported entirely from said frame and operated by said shaft, whereby the stator and rotor elements of the motor, the compressor and the drive shaft are assembled in rotatable operative relation upon the frame whether the latter is assembled within the casing or is disposed outside the casing.

12. In a refrigerating machine of the hermetically-sealed type, the combination of a hermetically sealed casing having a detachable portion, a frame disposed entirely within the casing, an electric motor including a field element encompassed and carried by said sleeve portion, the greater extent of the outer area of the sleeve portion carrying the field element metallically engaging the interior of the casing for the transmission of heat to the casing, a rotor element for the electric motor, a compressor, and a shaft for operatively connecting said motor and compressor, said motor, compressor and shaft being supported entirely from said frame, whereby the stator and rotor elements of the motor, the compressor and the drive shaft are assembled in rotatable operative relation upon the frame whether the latter is assembled within the casing or is disposed outside the casing.

13. In a refrigerating machine of the hermetically-sealed type, the combination of a hermetically-sealed casing, of substantially circular cross-section having a detachable portion, a frame disposed entirely within the casing, said frame embodying a sleeve portion of circular cross-section substantially conforming with the interior of the hermetically-sealed casing of circular cross-section, said frame being carried entirely by said casing, an electric motor including a field element encompassed and carried by said sleeve portion, the greater extent of the outer area of the sleeve portion carrying the field element metallically engaging the interior of the casing for the transmission of heat to the casing, a rotor element for the electric motor, a compressor, and a shaft for operatively connecting said motor and compressor, said motor, compressor and shaft being supported entirely from said frame, whereby the stator and rotor elements of the motor, the compressor and the drive shaft are assembled in rotatable operative relation upon the frame whether the latter is assembled within the casing or is disposed outside the casing.

14. In a refrigerating machine of the hermetically-sealed type, the combination of a hermetically-sealed casing, a frame disposed entirely within the casing, said frame embodying a sleeve portion which metallically engages a considerable surface of the interior of the casing, an electric motor including a stator element encompassed and carried by said sleeve element, a rotor element for the electric motor, said stator and rotor elements having an air gap therebetween, a reservoir of lubricant disposed in the bottom of said casing and partially immersing said stator, said lubricant having its level below said air gap, whereby heat is transmitted from the motor to the casing through the intermediary of said lubricant and also through the sleeve portion of said frame, a compressor, and a drive shaft for operatively connecting said motor and compressor, said motor compressor and shaft being supported entirely from said frame, whereby the stator and rotor elements of the rotor, the compressor, and the drive shaft are assembled in rotatable operative relation upon the frame whether the latter is disposed in the casing or is disposed outside the casing.

MATSON C. TERRY.
THOMAS A. BUCKLEY.